US011428524B2

(12) United States Patent
Gvero et al.

(10) Patent No.: US 11,428,524 B2
(45) Date of Patent: Aug. 30, 2022

(54) METHOD AND DEVICE FOR GENERATING A PULSED SIGNAL AT PARTICULAR POSITIONS OF A MOVING ELEMENT

(71) Applicant: MICRO-CONTRÔLE-SPECTRA PHYSICS, Evry (FR)

(72) Inventors: Daniel Gvero, Châteauneuf sur Loire (FR); Christophe Ahrens, Aschères-le-Marché (FR)

(73) Assignee: MICRO-CONTRÔLE-SPECTRA PHYSICS, Evry (FR)

( * ) Notice: Subject to any disclaimer, the term of this patent is extended or adjusted under 35 U.S.C. 154(b) by 431 days.

(21) Appl. No.: 16/624,498

(22) PCT Filed: Jun. 26, 2018

(86) PCT No.: PCT/FR2018/051563
§ 371 (c)(1),
(2) Date: Dec. 19, 2019

(87) PCT Pub. No.: WO2019/002755
PCT Pub. Date: Jan. 3, 2019

(65) Prior Publication Data
US 2020/0124413 A1   Apr. 23, 2020

(30) Foreign Application Priority Data

Jun. 28, 2017 (FR) ...................... 1755953

(51) Int. Cl.
*G01B 21/04* (2006.01)
*G01B 5/004* (2006.01)
*G01D 5/244* (2006.01)

(52) U.S. Cl.
CPC ............. *G01B 21/04* (2013.01); *G01B 5/004* (2013.01); *G01D 5/244* (2013.01)

(58) Field of Classification Search
CPC ........ G01B 21/04; G01B 5/004; G01D 5/244; G05B 19/19
See application file for complete search history.

(56) References Cited

U.S. PATENT DOCUMENTS 4,086,522 A * 4/1978 Engelberger ........... G05B 19/42
   29/430
5,450,202 A * 9/1995 Tisue .................... G01S 7/4811
   356/614

(Continued)

FOREIGN PATENT DOCUMENTS

CN    104597792 A  *  5/2015  ............... A62B 1/00
DE    102006003555 A1    7/2007

(Continued)

OTHER PUBLICATIONS

International Search Report dated Sep. 17, 2018, issued in corresponding International Application No. PCT/FR2018/051563, filed Jun. 26, 2018, 2 pages.

(Continued)

*Primary Examiner* — Tung S Lau
(74) *Attorney, Agent, or Firm* — Christensen O'Connor Johnson Kindness PLLC

(57) ABSTRACT

A generating device that includes: a unit for generating triggering positions, a unit for generating, during the course of the movement of the moving element, actual positions of said moving element, this unit further including a unit for measuring successive effective positions of the moving element, the actual positions including at least these measured effective positions, a unit for comparing, for a current triggering position, the actual positions successive to this current triggering position in such a way as to identify, among these successive actual positions, the closest actual position to said current triggering position, and this within a given limit, and a unit for generating a pulsed signal for the (Continued)

current triggering position, if and when the moving element reaches said closest actual position and that this position is situated within the given limit.

10 Claims, 3 Drawing Sheets

(56) References Cited

U.S. PATENT DOCUMENTS

| | | |
|---|---|---|
| 8,426,768 B2 | 4/2013 | Rekowski |
| 8,687,060 B1 * | 4/2014 | Wolff .................. G06F 3/03543 345/169 |
| 10,924,130 B1 * | 2/2021 | Serebryanskiy ... H03H 17/0657 |
| 2009/0184676 A1 * | 7/2009 | Schoerg ................. G05B 19/23 318/640 |

FOREIGN PATENT DOCUMENTS

| | | | |
|---|---|---|---|
| DE | 102014200131 A1 | 7/2015 | |
| FR | 3068458 B1 * | 8/2019 | ............. G01B 21/04 |
| JP | H0562093 A | 3/1993 | |
| JP | 2003089086 A | 3/2003 | |
| WO | WO2019/002755 A1 | 1/2019 | |

OTHER PUBLICATIONS

Written Opinion of the International Searching Authority dated Sep. 17, 2018, issued in corresponding International Application No. PCT/FR2018/051563, filed Jun. 26, 2018, 5 pages.

International Preliminary Report on Patentability mailed Dec. 31, 2019, issued in corresponding International Application No. PCT/FR2018/051563, filed Jun. 26, 2018, 6 pages.

Written Opinion of the International Searching Authority Sep. 17, 2018, issued in corresponding International Application No. PCT/FR2018/051563, filed Jun. 26, 2018, 4 pages.

* cited by examiner

METHOD AND DEVICE FOR GENERATING A PULSED SIGNAL AT PARTICULAR POSITIONS OF A MOVING ELEMENT

TECHNICAL FIELD

The present invention relates to a method and a device for generating a pulsed signal at positions called triggering positions of a moving element.

STATE OF THE ART

Generally, although not exclusively, a moving element is subjected to a relative movement with respect to a fixed support such as, for example, a support plate (or platform), provided with an object to be treated.

Typically, the relative displacement (or movement) of the moving element with respect to the support and to the object to be treated, can be generated by:
- a movement of the moving element, the object being fixed;
- a movement of the object, the element called moving element being fixed; or
- movements both of the moving element and of the object.

Often, a moving element comprises a treatment system. As an example, treatment systems comprise, without limitation, optical systems, mechanical systems, electrical systems and/or other similar systems, used in association with such a treatment system. This treatment system is intended to carry out various actions (or treatment operations, or mechanical, chemical, electrical or similar functions) such as a laser cut or a taking of images, in particular places on the object to be treated, the treatment functions being implemented at particular positions of the moving element during the relative movement between the moving element and the object.

Generally, to implement this type of operation, the kinetics and the position of the moving element are configured to arrive at the position sought at a predetermined time, for example when the particular treatment action (a laser cut, for example) is carried out. More specifically, the actions are carried out selectively at given instants, for example regular, and the movement of the moving element is controlled and correct so that the moving element is located in the correct position at each of these given instants.

The treatment operations are generally carried out, by using a subservience to control a treatment architecture of master/slave type. As an example, the master element corresponds to the instant of carrying out the action (for example, the instant of emitting a laser pulse) and the slave element corresponds to the reaching of the suitable position by the moving element.

Thus, in light of the above, various calculations, corrections and controls necessary for carrying out such treatment operations are difficult to implement, expensive and imprecise.

SUMMARY OF THE INVENTION

The present application seeks to overcome these disadvantages of the systems of the prior art. More specifically, the present application relates to a method for generating a pulsed signal at positions called triggering positions of a moving element, said moving element being capable of being subjected to a relative movement according to at least two degrees of freedom.

According to an embodiment, the method comprises a step of generating triggering positions, and said method is such that, during at least some of the movement of the moving element, the following successive following steps are implemented iteratively:
- a step of generating positions called actual positions, consisting of generating actual positions of said moving element defined according to axes corresponding to said degrees of freedom, the step of generating actual positions comprising a measuring step consisting of measuring, in real time, successive effective positions of the moving element, said actual positions comprising at least said effective positions;
- for successive triggering positions, at each time for a triggering position called current triggering position:
- a comparison step consisting of comparing successive actual positions, generated in real time at the step of generating actual positions, at this current triggering position so as to identify, from among these successive actual positions, the actual position closest to said current triggering position, and this within a given limit with respect to said current triggering position; and
- a step of generating a pulsed signal, consisting of generating a pulsed signal for the current triggering position, if and when the two following conditions are simultaneously fulfilled:
  - the moving element reaches said closest actual position; and
  - this closest actual position is situated within the given limit with respect to said current triggering position.

Thus, during the (relative) movement of the moving element (with respect to an object to be treated), the position of the moving element is determined, which is the closest position to a triggering position where an action must be carried out. When this closest position is reached, a pulsed (triggering) signal is emitted, which can trigger the action, for example a laser cut. This pulsed signal can correspond to the control of a laser cut or to the control of another action of optical, mechanical, chemical or other type, such as for example, a taking of images.

Thus, the triggering is carried out when the closest position is reached. The method therefore implements a master/slave subservience, wherein the master element is reached by the moving element of the position sought and the slave element is the generation of the triggering signal (when this position is reached), which makes it possible to obtain a facilitated and precise implementation (not requiring any precise subservience of the movement of the moving element as in usual solutions).

In the framework of the present invention, said moving element is capable of being moved according to N degrees of freedom (or movement or displacement), N being an integer greater than or equal to 2. As an illustration, for N equal to 6, if a plane XY is considered (for example, horizontal) defined by a direction X and a direction Y, orthogonal to one another, the six degrees of freedom correspond, respectively, to a translation along the direction X and a so-called rotation around this direction X, to a translation along the direction Y and a rotation around this direction Y, and to a translation along a direction called Z and a rotation around this direction Z, the direction Z being orthogonal to said directions X and Y. The method described is also applicable to an increased number of degrees of freedom.

Advantageously, the step of generating actual positions comprises an interpolation step consisting of determining a continuation of interpolated positions between, each time, two successive effective positions measured during the measuring step, by considering a movement speed of the moving element, said actual positions comprising said effective positions and, between two successive effective positions, said interpolated positions.

In addition, advantageously, the step of generating triggering positions comprises:
- an inputting sub-step consisting of inputting predetermined desired (triggering) positions; and
- a treatment sub-step consisting of adapting these desired positions to a triggering system configured to generate the relative movement of said moving element, from predetermined information relative to errors of said movement system, to deduce said triggering positions from it.

Furthermore, advantageously, the comparison step comprises:
- a calculation sub-step consisting of calculating a distance parameter $D^2$, preferably using the following expression:

$$D^2 = \sum_{i=1}^{N}(PRi - PCi)^2$$

wherein:
PR$_i$ represents the coordinate according to a degree of freedom Li of the actual position considered;
PC$_i$ represents the coordinate according to the degree of freedom Li of the current triggering position;
N represents the number of degrees of freedom Li of the moving element;
- a comparison sub-step consisting of calculating the difference between this distance parameter $D^2$ and a predetermined value; and
- an evaluation sub-step consisting of evaluating the variation of said difference and of detecting the position at which said difference is the lowest, the actual closest position corresponding to the latter position.

The present application also relates to a device for generating a pulsed signal at positions called positions for triggering a moving element, said moving element being capable of being subjected to a relative movement according to at least two degrees of freedom.

In an embodiment, said device comprises:
- a unit for generating triggering positions;
- a unit for generating positions called actual positions, configured to, during at least some of the movement of the moving element, generate actual positions of said moving element defined according to axes corresponding to said degrees of freedom, the unit for generating actual positions comprising a measuring unit configured to measure, in real time, successive effective positions of the moving element, said actual positions comprising at least said effective positions;
- a comparison unit configured to compare, for a triggering position called current triggering position, successive actual positions, generated in real time by the unit for generating actual positions, at this current triggering position so as to identify, from among these successive actual positions, the actual position closest to said current triggering position, and this within a given limit with respect to said current triggering position; and
- a unit for generating a pulsed signal, configured to generate a pulsed signal for the current triggering position, if and when the two following conditions are simultaneously fulfilled:
  - the moving element reaches said closest actual position; and
  - this closest actual position is situated within the given limit with respect to said current triggering position.

In a particular embodiment, the unit for generating actual positions comprises an interpolation unit configured to determine a continuation of interpolated positions between, each time, two successive effective positions measured by the measuring unit, by considering a movement speed of the moving element, said actual positions comprising said effective positions and, between two successive effective positions, said interpolated positions.

Moreover, in a particular embodiment, the unit for generating triggering positions comprises:
- a subunit for inputting predetermined theoretical triggering positions; and
- a treatment subunit configured to adapt these theoretical positions to a triggering system configured to generate the movement of said moving element, from predetermined information relative to errors of said movement system, to deduce said triggering positions from it.

Furthermore, advantageously, the comparison unit comprises:
- a calculation subunit configured to calculate a distance parameter $D^2$, preferably using the following expression:

$$D^2 = \sum_{i=1}^{N}(PRi - PCi)^2$$

wherein:
PR$_i$ represents the coordinate according to a degree of freedom Li of the actual position considered;
PC$_i$ represents the coordinate according to the degree of freedom Li of the current triggering position;
N represents the number of degrees of freedom Li of the moving element;
- a comparison sub-step configured to calculate the difference between this distance parameter $D^2$ and a predetermined value; and
- an evaluation sub-step configured to evaluate the variation of said difference and of detecting the position at which said difference is the lowest, the actual closest position corresponding to this position.

The present application also relates to a treatment assembly (optical, mechanical, chemical, etc.) of an object, for example, an electronic component, said treatment assembly comprising:
- a support carrying said object;
- a moving element provided with a treatment system capable of carrying out an action (of optical, mechanical, chemical type, etc.), during the receiving of a pulsed triggering signal, the moving element carrying out a relative movement with respect to said support; and
- a device for generating a pulsed signal, such as that described above, which is intended to generate and to transmit said system for treating a pulsed signal during the movement of said moving element.

BRIEF DESCRIPTION OF THE FIGURES

The appended figures make it possible for a more complete understanding of the method and of the device for generating pulsed signals at particular positions of a moving element. On these figures, identical references designate similar elements.

DETAILED DESCRIPTION

Figure 1:
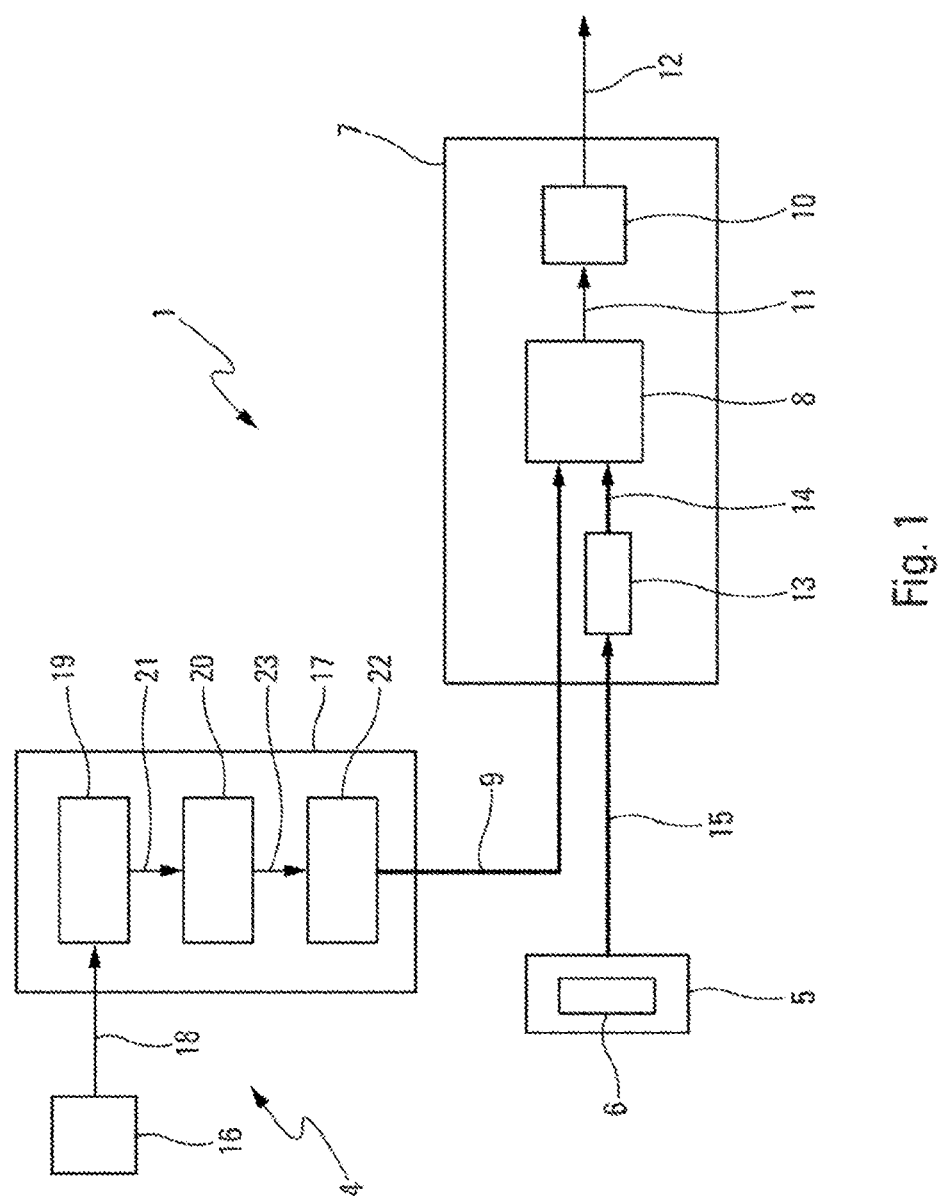
FIG. 1 is a diagram of a particular embodiment of a device for generating a pulsed signal.
Figure 2:
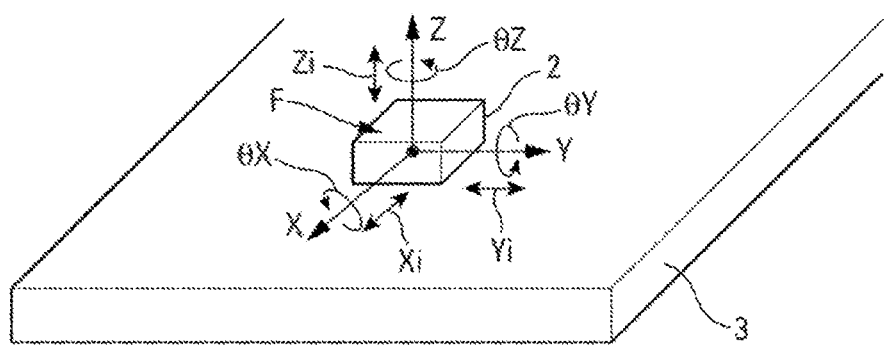
FIG. 2 schematically illustrates possible degrees of freedom during a (relative) movement of the moving element.

The device 1 schematically represented in FIG. 1 is a device for generating a pulsed signal at particular positions called triggering positions of a moving element 2 (FIG. 2).

Said moving element 2 is subjected to a relative movement with respect to a support 3 (FIG. 2), for example a support plate (or platform), provided with an object (not represented) to be treated.

In the framework of the present invention, the displacement (or movement) relating to the moving element 2 with respect to the support 3 and to the object preferably corresponds to a movement of the moving element 2, the support 3 and the object being fixed. However, it can also be:
- a movement of the object, the element (called moving element) being fixed; or
- movements both of the moving element and of the object.

In the framework of the present invention, said moving element 2 is capable of being subjected to a relative movement according to N degrees of freedom, N being an integer greater than or equal to 2.

Below, an example is presented, wherein N is equal to 6. The support 3 is, for example, arranged substantially parallel to a horizontal plane XY defined by a direction called X (or longitudinal direction) and a direction called Y (or lateral direction), as illustrated in FIG. 2. The marker F represented in FIG. 2 which is intended to facilitate the understanding, comprises, in addition to the directions (or axes) X and Y forming the horizontal plane XY, a direction (or axis) called Z (or vertical) which is orthogonal to said plane XY. The six possible degrees of freedom (represented by double arrows) correspond, respectively, as illustrated in FIG. 2:
- to a translation, called Xi, along the direction X;
- to a rotation, called θX, along the direction X;
- to a translation, called Yi, along the direction Y;
- to a rotation called θY, along the direction Y;
- to a translation, called Zi, along the direction Z; and
- to a rotation called θZ, along the direction Z.

The method and the device are also applicable to another number N (greater than 2) of degrees of freedom, and in particular to a number N greater than 6, for example, in the framework of complex multi-axis positionings.

In an embodiment, said moving element 2 and said support 3 form part of a treatment assembly (not represented). This treatment assembly of different possible types, comprises:
- said support 3 carrying said object;
- said moving element 2 provided with a treatment system which can carry out an action (of optical, mechanical, chemical type, etc.) during the receiving of a pulsed triggering signal, the moving element 2 and the treatment system carrying out a relative movement with respect to the support 3 and to the object to be treated; and
- said device 1 for generating a pulsed signal, specified below, which is intended to generate and transmit to said treatment system, a pulsed signal during the movement of said moving element 2.

The device 1 for generating a pulsed signal comprises, as represented in FIG. 1:
- a unit 4 for generating triggering positions, specified below;
- a unit 5 for generating so-called actual positions. The unit 5 is configured to generate, automatically and in real time, actual positions of said moving element 2 which are defined according to at least some of the above-mentioned degrees of freedom Xi, Yi, Zi, θX, θY, and θZ. The unit 5 comprises, to this end, a measuring unit 6 configured to measure, in real time, successive effective positions of the moving element 2. Said actual positions comprise at least these measured effective positions, as specified below; and
- a central unit 7 comprising:
- a comparison unit 8 configured to compare, automatically and in real time, for a so-called current triggering position, of successive actual positions (generated in real time by the unit 5 for generating actual positions), to this current triggering position received via a connection 9 of the unit 4 for generating triggering positions. The comparison unit 8 is configured to, from this comparison, identify, from among these successive actual positions (received from the unit 5), the actual position closest to said current triggering position, and this within a given limit with respect to said current triggering position; and
- a unit 10 for generating a pulsed signal, which is connected by way of a connection 11 to the comparison unit 8, which receives the result of the treatment implemented by the comparison unit 8 and which is capable of automatically emitting a pulsed signal by way of a connection 12 to a user means (not represented), preferably to the abovementioned treatment system.

In an embodiment, the unit 10 for generating a pulsed signal is configured to generate a pulsed signal for the current triggering position, if and when the two following conditions are simultaneously fulfilled:
- the moving element 2 reaches said closest actual position; and
- this closest actual position is situated within the given limit with respect to said current triggering position.

In an embodiment, the unit 5 for generating actual positions also comprises an interpolation unit 13 which is connected by way of a connection 14 to the comparison unit 8. The interpolation unit 13 can be integrated in the unit 5, or also in the central unit 7 as in the example of FIG. 1.

The interpolation unit 13 is configured to determine a continuation of interpolated positions between, each time, two successive effective positions measured by the measuring unit 6, for example, a first position or "upstream position" and a second position or "downstream position". The interpolation unit 13 can be configured to consider an assumed speed of movement of the moving element 2 between these first and second positions or upstream and downstream positions, and it determines, usually, a given number of interpolated positions between these two measured successive positions (first and second or upstream and downstream). The speed of movement considered in a current step can be the speed of movement of the moving element 2 of the preceding step, which is measured. The interpolation is carried out with a sufficiently large interpolation frequency, such that it cannot be physically having a variation of speed there which is too much, and such that a positioning resolution is remained within, which is a lot less than the resolution aimed for by the application considered.

The actual positions transmitted to the comparison unit 8, by way of the connection 14, thus comprise:
- the effective positions measured by the measuring unit 6 (at a frequency, for example, of 5 MHz); and
- between two successive effective positions, the interpolated positions, determined by the interpolation unit 13 and emitted at a higher frequency, for example at 200 MHz.

Moreover, in a particular embodiment, the unit 4 for generating triggering positions comprises, as represented in FIG. 1:
- an inputting element 16, for example a computer keyboard, a mouse and/or any other usual means for inputting data. The inputting element 16 makes it possible for an operator to input desired and predetermined (triggering) positions in a treatment element 17, for example a central treatment unit of the CPU type, as illustrated by a connection 18; and
- the treatment element 17 which is configured to adapt these desired positions to a movement system configured to generate the relative movement of the moving element, from predetermined information relating to errors of said movement system, to deduce said triggering positions from it.

To this end, in an embodiment, the treatment element 17 can comprise:
- an element 19 which is connected by way of the connection 18 to the inputting element 16 and which contains features, in particular of the abovementioned movement system;
- an element 20 which is connected by way of a connection 21 to the element 19 and which determines errors of the movement system; and
- an element 22 which is connected by way of a connection 23 to the element 20 and which determines triggering positions, corresponding to corrected positions of the desired positions entered (using the inputting element 16) by considering errors of the movement system.

Figure 3:
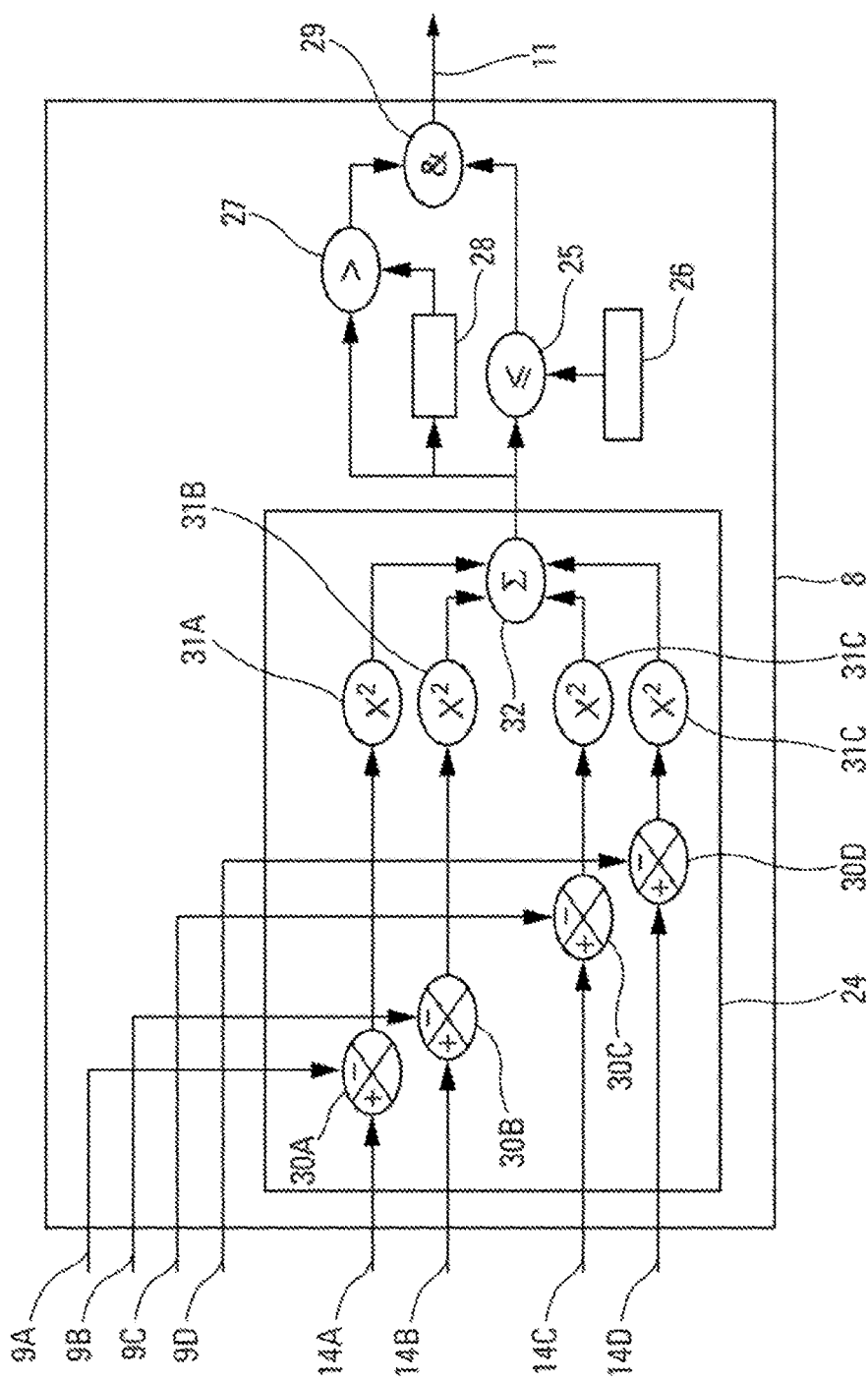
FIG. 3 is the synoptic diagram of a unit for comparing the device of FIG. 1.

Furthermore, the comparison unit 8 (which is configured to identify the actual position closest to the current triggering position) comprises, as represented in FIG. 3:
- a calculation element 24 which is configured to calculate a distance parameter $D^2$ specified below;
- a comparison element 25 which is configured to calculate the difference between this distance parameter $D^2$ and a predetermined value $R^2$ recorded in a storage element 26; and
- an evaluation subunit which is configured to evaluate the variation of said difference and to detect the position at which said difference is the lowest, the closest actual position corresponding to this position.

Figure 4:
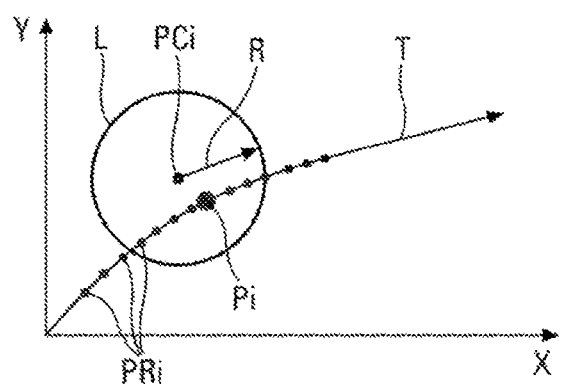
FIG. 4 schematically shows, partially, a movement path of a moving element with respect to a position called triggering position.

The evaluation subunit comprises an element 29 which verifies if the two following conditions are simultaneously fulfilled:
- a first condition, which is verified by the element 25, according to which the closest actual position Pi is situated within the given limit L with respect to the current triggering position PCi, as represented in FIG. 4. In this FIG. 4, the current triggering position PCi has been represented, to which is associated a given limit L (in this case, a circle of radius R centred on PCi), as well as different successive actual positions PRi of the moving element which is moved along a path T (situated as an illustration in a plane XY in this example of FIG. 4); and
- a second condition, which is verified by the elements 27 and 28, according to which the moving element 2 reaches the closest actual position Pi from among the different actual positions PRi during the movement thereof along the path T.

To do this:
- the element 28 is an element making it possible to record the distance parameter $D^2$ (calculated by the calculation element 24) for the actual position preceding the current actual position; and
- the element 27 calculates, for each current actual position, the difference between this distance parameter for the preceding position (recorded in the element 28) and the distance parameter $D^2$ (calculated by the calculation element 24) for this current actual position, and it concludes that the closest actual position Pi is reached as soon as this difference (which decreases beforehand when the moving vehicle approaches the current triggering position PCi) starts again to increase.

In a preferred embodiment, the calculation element 24 calculates the distance parameter $D^2$ using the following expression:

$$D^2 = \sum_{i=1}^{N} (PRi - PCi)^2$$

wherein:
- $PR_i$ represents the coordinate according to a degree of freedom Li of the actual position considered;
- $PC_i$ represents the coordinate according to the degree of freedom Li of the current triggering position;
- N represents the number of degrees of freedom Li of the moving element.

To do this, in the case of an embodiment example based on four degrees of freedom (N=4), the calculation element 24 comprises:
- elements 30A, 30B, 30C and 30D to calculate the differences, respectively, between, on the one hand, the four PRi values (PR1, PR2, PR3, PR4) received via connections 14A, 14B, 14C and 14D (forming part of the connection 14 of FIG. 1) and, on the other hand, the four PCi values (PC1, PC2, PC3, PC4) received via connections 9A, 9B, 9C and 9D (forming part of the connection 9 of FIG. 1);
- elements 31A, 31B, 31C and 31D to calculate, respectively, the squares of these differences; and
- an element 32 to sum the results provided by the elements 31A, 31B, 31C and 31D.

Optionally, instead of using a calculation of the least squares as described above, the calculation element 24 can also use another calculation such as a sum of absolute values or a calculation with another power, for example.

Figure 5:
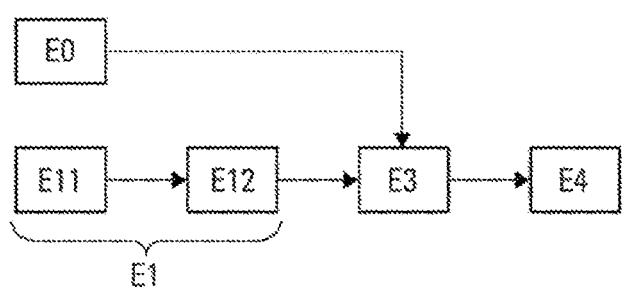
FIG. 5 schematically illustrates a method for generating pulsed signals, implemented by the device of FIG. 1.

Below, the functioning of the device 1 such as described above is described, from a method (represented in FIG. 5), for generating a pulsed signal. Said method comprises a preliminary step E0 of generating triggering positions, implemented by the unit 4.

Said method in addition comprises, during at least some of the movement of the moving element, the continuation of following successive steps which is implemented iteratively:

a step E1 of generating actual positions, implemented by the unit 5 and consisting of generating actual positions PRi (FIG. 4) of said moving element 2, which are defined according to the axes corresponding to the degrees of freedom considered, the step E1 comprising:
a measuring step E11, implemented by the unit 6 and consisting of measuring, in real time, successive effective positions of the moving element; and
an interpolation step E12, implemented by the unit 13 and consisting of determining a continuation of interpolated positions between, each time, two successive effective positions measured during the measuring step E11, the actual positions comprising all of the measured effective positions and interpolated positions;
for successive triggering positions, each time for a triggering position called current triggering position PCi:
a comparison step E3, implemented by the unit 8 and consisting of comparing successive actual positions, generated in real time in step E1 of generating actual positions, at this current triggering position PCi so as to identify, from among these successive actual positions PRi, the actual position Pi closest to said current triggering position PCi, and this within the given limit L with respect to said current triggering position PCi; and
a step E4 of generating a pulsed signal, implemented by the unit 10 and consisting of generating a pulsed signal for the current triggering position PCi, if and when the two following conditions are simultaneously fulfilled:
the moving element 2 reaches said closest actual position Pi (from among the different actual positions PRi successively reached); and
this closest actual position Pi is situated within the given limit L with respect to the current triggering position PCi considered.

When a pulsed signal is generated in step E4 (at the current triggering position), the following triggering position is considered as a new current triggering position, and steps E3 and E4 are again implemented for this new current triggering position. These steps E3 and E4 are implemented iteratively for each triggering position.

The invention claimed is:

1. A method for generating a pulsed signal comprising: at positions called triggering positions of a moving element, said moving element being capable of being subjected to a relative movement according to at least two degrees of freedom, said method comprising a step of generating triggering positions, method according to which, during at least some of the movement of the moving element, the continuation of following successive steps is implemented iteratively:
a step (E1) of generating positions called actual positions, consisting of generating actual positions (PRi) of said moving element defined according to axes (Xi, θX, Yi, θY, Zi, θZ) corresponding to said degrees of freedom, the step (E1) of generating actual positions comprising a measuring step (E11) consisting of measuring, in real time, successive effective positions of the moving element, said actual positions (PRi) comprising at least said effective positions;
for successive triggering positions, each time for a triggering position (PCi) called current triggering position:
a comparison step (E3) consisting of comparing successive actual positions (PRi), generated in real time in step (E1) of generating actual positions, at this current triggering position (PCi) so as to identify, from among these successive actual positions (PRi), the actual position (Pi) closest to said current triggering position (PCi), and this within a given limit (L) with respect to said current triggering position (PCi); and
a step (E4) of generating a pulsed signal, consisting of generating a pulsed signal for the current triggering position (PCi), if and when the two following conditions are simultaneously fulfilled:
the moving element reaches said closest actual position (Pi); and
this closest actual position (Pi) is situated within the given limit (L) with respect to said current triggering position (PCi).

2. The method according to claim 1, wherein the step (E1) of generating actual positions comprises an interpolation step (E12) consisting of determining a continuation of interpolated positions between, each time, two successive effective positions measured during the measuring step, by considering that a speed of movement of the moving element, said actual positions (PRi) comprising said effective positions and, between two successive effective positions, said interpolated positions.

3. The method according to claim 1, wherein the step (E1) of generating triggering positions comprises:
an inputting sub-step consisting of inputting desired positions; and
a treatment sub-step consisting of adapting these desired positions to a movement system configured to generate the relative movement of said moving element, from predetermined information relating to errors of said movement system, to deduce said triggering positions from it.

4. The method according to claim 1, wherein the comparison step (E3) comprises:
a calculation sub-step consisting of calculating a distance parameter;
a comparison sub-step consisting of calculating the difference between this distance parameter and a predetermined value; and
an evaluation sub-step consisting of evaluating the variation of said difference and of detecting the position at which said different is the lowest, the closest actual position corresponding to this latter position.

5. The method according to claim 4, wherein the calculation sub-step consists of calculating the distance parameter $D^2$ using the following expression:

$$D^2 = \sum_{i=1}^{N} (PRi - PCi)^2$$

wherein:
$PR_i$ represents the coordinate according to a degree of freedom Li of the actual position considered;
$PC_i$ represents the coordinate according to the degree of freedom Li of the current triggering position; and
N represents the number of degrees of freedom Li of the moving element.

6. A device for generating a pulsed signal comprising: at positions called triggering positions of a moving element, said moving element being capable of being subjected to a relative movement according to at least two degrees of freedom, said device comprising:
a unit for generating triggering positions;

a unit (5) for generating positions called actual positions, configured to, during at least some of the movement of the moving element, generate actual positions (PRi) of said moving element defined according to axes (Xi, θX, Yi, θY, Zi, θZ) corresponding to said degrees of freedom, the unit for generating actual positions comprising a measuring unit configured to measure, in real time, successive effective positions of the moving element, said actual positions (PRi) comprising at least said effective positions;

a comparison unit configured to compare, for a triggering position (PCi) called current triggering position, successive actual positions (PRi), generated in real time by the unit for generating actual positions, at this current triggering position (PCi) so as to identify, from among these successive actual positions (PRi), the actual position (Pi) closest to said current triggering position (PCi), and this within a given limit (L) with respect to said current triggering position (PCi); and a unit for generating a pulsed signal, configured to generate a pulsed signal for the current triggering position (PCi), if and when the two following conditions are simultaneously fulfilled:

the moving element reaches said closest actual position (Pi); and this closest actual position (Pi) is situated within the given limit (L) with respect to said current triggering position (PCi).

7. The device according to claim 6, wherein the unit for generating actual positions comprises an interpolation unit configured to determine a continuation of interpolated positions between, each time, two successive effective positions measured by the measuring unit, by considering a speed of movement of the moving element, said actual positions comprising said effective positions and, between two successive effective positions, said interpolated positions.

8. The device according to claim 6, wherein the unit for generating triggering positions comprises:

an inputting subunit configured to input predetermined theoretical triggering positions; and a treatment subunit configured to adapt these theoretical positions to a movement system configured to generate the movement of said moving element, from predetermined information relating to errors of said movement system to deduce said triggering positions from it.

9. The device according to claim 6, wherein the comparison unit comprises:

a calculation subunit configured to calculate a distance parameter;

a comparison subunit configured to calculate the difference between this distance parameter and a predetermined value; and an evaluation subunit configured to evaluate the variation of said difference and to detect the position to which said difference is the lowest, the closest actual position corresponding to this position.

10. An assembly for treating an object, comprising:

a support carrying said object;

a moving element provided with a treatment system capable of carrying out an action during the receiving of a pulsed triggering signal, the moving element carrying out a relative movement with respect to said support; and a device for generating a pulsed signal, such as that specified in claim 6, which is intended to generate and to transmit to said treatment system, pulsed signals during the movement of said moving element.

* * * * *